United States Patent
Lee et al.

(10) Patent No.: US 10,575,354 B2
(45) Date of Patent: *Feb. 25, 2020

(54) SIGNAL TRANSMISSION METHOD IN DEVICE-TO-DEVICE COMMUNICATION AND APPARATUS THEREFOR

(71) Applicant: LG ELECTRONICS INC., Seoul (KR)

(72) Inventors: Jihyun Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/364,858

(22) Filed: Mar. 26, 2019

(65) Prior Publication Data

US 2019/0223240 A1 Jul. 18, 2019

Related U.S. Application Data

(63) Continuation of application No. 14/912,395, filed as application No. PCT/KR2014/007634 on Aug. 18, 2014, now Pat. No. 10,314,092.

(Continued)

(51) Int. Cl.
*H04W 76/14* (2018.01)
*H04W 72/02* (2009.01)

(Continued)

(52) U.S. Cl.
CPC ........... *H04W 76/14* (2018.02); *H04W 72/02* (2013.01); *H04L 5/0051* (2013.01); *H04L 5/0053* (2013.01);
(Continued)

(58) Field of Classification Search
CPC ..... H04L 67/12; H04L 5/0051; H04L 5/0053; H04W 4/70; H04W 28/00;
(Continued)

(56) References Cited

U.S. PATENT DOCUMENTS 6,947,748 B2 9/2005 Li et al.
7,715,358 B2 5/2010 Li et al.
(Continued)

FOREIGN PATENT DOCUMENTS

CN 102638893 A 8/2012
CN 102792759 A 11/2012
(Continued)

*Primary Examiner* — Brian T O Connor
(74) *Attorney, Agent, or Firm* — Birch, Stewart, Kolasch & Birch, LLP

(57) ABSTRACT

A method for resource allocation of a User Equipment (UE) configured to perform device-to-device (D2D) communication in a wireless communication system is discussed. The method includes receiving, from a serving base station, a message including information on a transmission resource region, where the information on the transmission resource region includes information on available resources to transmit D2D data for when the UE is in an out-sync condition, and transmitting, to another UE, the D2D data based on a part of the available resources included in the information on the transmission resource region when the UE is in the out-sync condition.

12 Claims, 10 Drawing Sheets

Related U.S. Application Data

(60) Provisional application No. 61/935,814, filed on Feb. 4, 2014, provisional application No. 61/867,608, filed on Aug. 20, 2013, provisional application No. 61/866,561, filed on Aug. 16, 2013.

(51) Int. Cl.
  *H04W 88/02* (2009.01)
  *H04W 72/04* (2009.01)
  *H04W 56/00* (2009.01)
  *H04L 5/00* (2006.01)
  *H04W 12/08* (2009.01)
  *H04W 92/18* (2009.01)

(52) U.S. Cl.
  CPC .......... *H04W 12/08* (2013.01); *H04W 56/002* (2013.01); *H04W 72/042* (2013.01); *H04W 72/0406* (2013.01); *H04W 72/0413* (2013.01); *H04W 88/02* (2013.01); *H04W 92/18* (2013.01)

(58) Field of Classification Search
  CPC ........... H04W 28/0215; H04W 72/048; H04W 76/14; H04W 72/02; H04W 12/08; H04W 56/002; H04W 72/0406; H04W 92/18; H04W 72/042; H04W 72/0413; H04W 88/02; Y02D 70/20; Y02D 70/21
  See application file for complete search history.

(56) References Cited

U.S. PATENT DOCUMENTS

| | | | |
|---|---|---|---|
| 8,824,383 B2 | 9/2014 | Lindoff et al. | |
| 9,173,124 B2 | 10/2015 | Heo et al. | |
| 9,288,793 B2 | 3/2016 | Wang et al. | |
| 9,363,064 B2 | 6/2016 | Gao et al. | |
| 9,414,427 B2 | 8/2016 | Yang et al. | |
| 9,432,797 B2 | 8/2016 | Xu et al. | |
| 9,451,652 B2 | 9/2016 | Gohari et al. | |
| 9,491,738 B2 | 11/2016 | Chen et al. | |
| 9,496,997 B2 | 11/2016 | Park et al. | |
| 9,497,644 B2 | 11/2016 | Behravan et al. | |
| 9,532,361 B2 | 12/2016 | Sartori et al. | |
| 9,560,614 B2 | 1/2017 | Sorrentino et al. | |
| 9,565,573 B2 | 2/2017 | Mukherjee et al. | |
| 9,614,641 B2 | 4/2017 | Geirhofer et al. | |
| 9,974,051 B2 | 5/2018 | Sorrentino et al. | |
| 10,314,092 B2 * | 6/2019 | Lee | H04W 72/02 |
| 2013/0005377 A1 | 1/2013 | Wang et al. | |
| 2014/0269641 A1 | 9/2014 | Jang et al. | |
| 2014/0286284 A1 | 9/2014 | Lim et al. | |
| 2014/0286293 A1 | 9/2014 | Jang et al. | |
| 2014/0342747 A1 | 11/2014 | Lee et al. | |
| 2015/0043398 A1 | 2/2015 | Fwu et al. | |
| 2015/0045050 A1 | 2/2015 | Sartori et al. | |
| 2015/0327239 A1 | 11/2015 | Webb et al. | |
| 2016/0029234 A1 | 1/2016 | Zhang et al. | |
| 2016/0183231 A1 | 6/2016 | Shi et al. | |
| 2016/0261389 A1 | 9/2016 | Bontu et al. | |
| 2016/0295597 A1 | 10/2016 | Franz et al. | |
| 2017/0034813 A1 | 2/2017 | Chen et al. | |
| 2017/0078055 A1 | 3/2017 | Malladi et al. | |
| 2017/0135056 A1 | 5/2017 | Sorrentino et al. | |
| 2018/0263020 A1 | 9/2018 | Sorrentino et al. | |

FOREIGN PATENT DOCUMENTS

| | | |
|---|---|---|
| CN | 102893657 A | 1/2013 |
| WO | WO 2013/062310 A1 | 5/2013 |
| WO | WO 2013/066126 A1 | 5/2013 |
| WO | WO 2013/077684 A1 | 5/2013 |
| WO | WO 2013/109100 A1 | 7/2013 |

* cited by examiner (1) D2D TX (2) D2D RX (a) SF #n (b) SF #m

Used Cluster (a)

<Configuration index>

(1) `1 1 0 0 1 1 0 0 1 1 0 0 1 1 0 0`  2RB (2) `1 0 0 0 1 0 0 0 1 0 0 0 1 0 0 0`  2RB (3) `1 1 0 0 1 1 0 0 1 1 0 0 1 1 0 0`  1RB (b)

SIGNAL TRANSMISSION METHOD IN DEVICE-TO-DEVICE COMMUNICATION AND APPARATUS THEREFOR

CROSS-REFERENCE TO RELATED APPLICATIONS

This Application is a Continuation of U.S. patent application Ser. No. 14/912,395 filed on Feb. 16, 2016 (now U.S. Pat. No. 10,314,092, issued Jun. 4, 2019), which is the National Phase of PCT International Application No. PCT/KR2014/007634 filed on Aug. 18, 2014, which claims the priority benefit under 35 U.S.C. § 119(e) to U.S. Provisional Application Nos. 61/935,814 filed on Feb. 4, 2014, 61/867,608 filed on Aug. 20, 2013 and 61/866,561 filed on Aug. 16, 2013, all of which are hereby expressly incorporated by reference into the present application.

BACKGROUND OF THE INVENTION

Field of the Invention

The present invention relates to a wireless communication system and, more particularly, to a method of transmitting a signal in device-to-device (D2D) communication and an apparatus therefor.

Discussion of the Related Art

In cellular communication, a terminal which is present in a cell accesses a base station to perform communication, receives control information for exchange of data from the base station, and then exchanges data with the base station. In other words, since the terminal exchanges data through the base station, in order to transmit data to another cellular terminal, the terminal transmits the data to the base station, and the base station receiving the data delivers the received data to the other cellular terminal. In this way, when one terminal transmits data to another terminal, the data can be transmitted through the base station. Therefore, the base station schedules a channel and a resource for data exchange, and transmits channel and resource scheduling information to respective terminals. As described above, when communication between terminals is to be performed through the base station, channels and resources for data exchange need to be allocated to the respective terminals from the base station. However, in device-to-device (D2D) communication, a terminal transmits data without using the based station or a repeater, and thus directly exchanges a signal with a desired terminal.

Resource allocation for D2D communication needs to be defined. In particular, a signaling scheme according to an object that allocates resources and information that may assist in optimum resource allocation need to be defined.

SUMMARY OF THE INVENTION

An object of the present invention devised to solve the problem lies in a method of supporting efficient resource allocation for device-to-device (D2D) communication in a wireless communication system.

Technical problems to be solved by the present invention are not limited to the above-mentioned technical problems, and other technical problems not mentioned may be clearly understood by those skilled in the art from description below.

The object of the present invention can be achieved by providing a method for resource allocation of a terminal configured to perform device-to-device (D2D) communication in a wireless communication system, the method including receiving information about an entire available resource region of D2D communication from a serving base station, transmitting, to the base station, a request for resource allocation to be used for D2D communication based on the information about the entire available resource region and channel information of D2D communication, and receiving, from the serving base station, resource allocation information for D2D communication determined based on the request for resource allocation.

Additionally or alternatively, the method may further include transmitting auxiliary information for resource allocation of D2D communication to the serving base station, wherein the auxiliary information may include at least one of a resource utilization rate for D2D communication, an avoided or preferred resource for D2D communication, and information about a channel state and interference of D2D communication.

Additionally or alternatively, the method may further include receiving updated resource allocation information of D2D communication determined based on the auxiliary information.

Additionally or alternatively, at least one of the information about the entire available resource region of D2D communication, the request for resource allocation, and the resource allocation information may be in a bitmap form.

Additionally or alternatively, the channel information of D2D communication may include at least one of a traffic load, a channel state, and an interference amount of a D2D communication channel.

Additionally or alternatively, the request for resource allocation may include information about a D2D transmission mode divided into D2D transmission or D2D reception.

Additionally or alternatively, the method may further include transmitting another request for resource allocation to the serving base station when the channel information of D2D communication is changed to an extent exceeding a predetermined range.

In another aspect of the present invention, provided herein is a method for resource allocation of a terminal configured to perform D2D communication in a wireless communication system, the method including transmitting information about an entire available resource region of D2D communication to the terminal, receiving, from the terminal, a request for resource allocation to be used for D2D communication based on the information about the entire available resource region and channel information of D2D communication, and transmitting, to the terminal, resource allocation information for D2D communication determined based on the request for resource allocation.

Additionally or alternatively, the method may further include receiving auxiliary information for resource allocation of D2D communication from the terminal, wherein the auxiliary information may include at least one of a resource utilization rate for D2D communication, an avoided or preferred resource for D2D communication, and information about a channel state and interference of D2D communication.

Additionally or alternatively, the method may further include determining updated resource allocation information of D2D communication determined based on the auxiliary information, and transmitting the determined resource allocation information to the terminal.

Additionally or alternatively, at least one of the information about the entire available resource region of D2D communication, the request for resource allocation, and the resource allocation information may be in a bitmap form.

Additionally or alternatively, the channel information of D2D communication may include at least one of a traffic load, a channel state, and an interference amount of a D2D communication channel.

Additionally or alternatively, the request for resource allocation may include information about a D2D transmission mode divided into D2D transmission or D2D reception.

Additionally or alternatively, the method may further include receiving another request for resource allocation to the serving base station when the channel information of D2D communication is changed to an extent exceeding a predetermined range.

In another aspect of the present invention, provided herein is a terminal configured to perform D2D communication in a wireless communication system, including a radio frequency (RF) unit, and a processor configured to control the RF unit, wherein the processor is configured to receive information about an entire available resource region of D2D communication from a serving base station, transmit, to the base station, a request for resource allocation to be used for D2D communication based on the information about the entire available resource region and channel information of D2D communication, and receive, from the serving base station, resource allocation information for D2D communication determined based on the request for resource allocation.

It should be noted that the above-mentioned technical solutions are merely a part of embodiments of the present invention, and various embodiments reflecting technical characteristics of the present invention may be derived and understood by those skilled in the art from detailed description of the present invention given below.

According to an embodiment of the present invention, it is possible to efficiently allocate resources for device-to-device (D2D) communication in a wireless communication system.

Effects that may be obtained from the present invention are not limited to the above-mentioned effects, and other effects not mentioned may be clearly understood by those skilled in the art from description below.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE EMBODIMENTS

Figure 1:
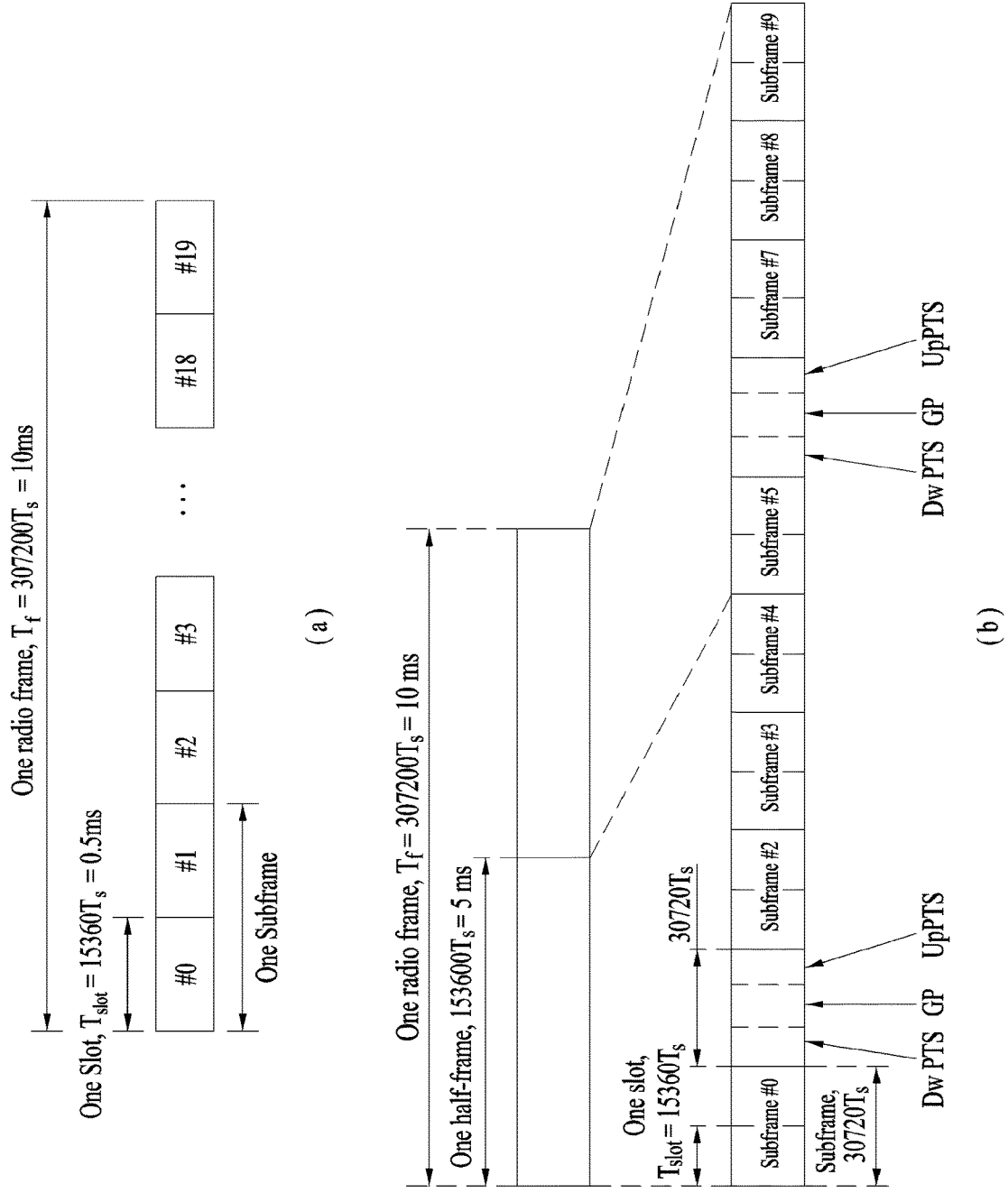
FIG. 1 is a diagram illustrating an example of a structure of a radio frame used in a wireless communication system.

Hereinafter, the preferred embodiments of the present invention will now be described in detail with reference to the accompanying drawings. The detailed description of the present invention that is to be disclosed along with the appended drawings is merely given to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

In the present invention, the fixed user devices (user equipment, UE) is, or may have mobility, the base station (base station, BS) communicates with the user data and/or various devices are to transmit and receive various kinds of control information In belongs. The UE terminal (Terminal Equipment), MS (Mobile Station), MT (Mobile Terminal), UT (User Terminal), SS (Subscribe Station), wireless device (wireless device), PDA (Personal Digital Assistant), wireless modem (wireless modem), etc. can be referred to as a mobile device (handheld device). In the present invention, BS generally refers to a UE and/or a fixed station that communicates with another BS (fixed station), by communicating with the UE and another BS exchanges various kinds of data and control information. The BS ABS (Advanced Base Station), NB (Node-B), eNB (evolved-NodeB), BTS (Base Transceiver System), an access point (Access Point), PS (Processing Server) and other terms are to be referred to. In the description of the present invention will hereinafter be collectively referred to as BS eNB.

In the present invention the node (node) means a fixed point (point) to which can be transmitted/received to the user equipment communicates with the radio signal. ENB may be of various types are used as nodes, regardless of their names. For example, BS, NB, eNB, pico-cell eNB (PeNB), the home eNB (HeNB), a relay, repeaters and the like can be a node. In addition, the node may not be the least eNB. For example, the wireless remote head (radio remote head, RRH), the wireless remote unit (radio remote unit, RRU) could be a. RRH, RRU, etc. generally have a lower power level than the power level of the eNB (power level). RRH or less RRU, RRH/RRU) is generally because they are connected to the eNB as private line (dedicated line), such as an optical cable, in general than the cooperative communication by the eNB connected to the radio network, RRH/RRU and eNB by the cooperative communication it may be performed smoothly. The node has at least one antenna is provided. The antenna may also refer to a physical antenna, and the antenna port, it is possible to sense the virtual antenna, or antenna group. Node is also called a point (point). Antennas existing (conventional) centralized antenna system to be controlled by a single eNB controller (controller) and is concentrated in the base station location (centralized antenna system, CAS) (i.e., a single-node system) and other, in a multi-node system a plurality of nodes are spaced apart a predetermined distance above the normal. The plurality of nodes, each node controls the operation of, or may be managed by the data to be transmitted/received by each node to at least one eNB or eNB controller to schedule (scheduling). Each node can be connected via the eNB or the eNB controller cable (cable) or a private line managed by the node (dedicated line). The multi-node system, from the signal through a plurality of nodes/transmitted/received in the same cell ID (identifier, ID) that may be used or it can be a different cell ID is used. When a plurality of nodes having the same cell ID, wherein each of the plurality of nodes operates as a part of the antenna group of a cell. If the nodes in a multiple-node system having a different cell ID, such a multi-node system, a multi-cell (e.g., macro-cell/femto-cell/pico-cells) can be seen as system. If a plurality of nodes, and each of the multiple cells are formed of a type wherein the overlay according to the coverage, especially the multi-cell network are formed multi-layer (multi-tier) is referred to as a network. RRH/cell ID in the cell ID and the eNB is the RRU may be the same or different. RRH/RRU if the eNB has to use a different cell ID, RRH/RRU and the base station eNB will operate as an independent all.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a DL signal is discriminated from a node transmitting a UL signal is called multi-eNB MIMO or coordinated multi-point Tx/Rx (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DSP). When JP is performed, a wider variety of communication environments can be formed, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. In JP, DPS refers to a communication scheme by which a signal is transmitted/received through a node selected from plural nodes according to a specific rule. In the case of DPS, signal transmission reliability can be improved because a node having a good channel state between the node and the UE is selected as a communication node.

In the present invention, it referred to as cell (cell) refers to a certain geographical area, one or more nodes to provide communication services. Thus, in the present invention it is also that the specific cells and communication means may communicate with the eNB or a node that provides a communication service to the particular cell. Further, the down-link/uplink signal of the cell means a cell in the specified from the eNB or the node that provides communication services/to the downlink/uplink signal. A cell providing the UE to the up/down-link communication service is called a particular serving cell (serving cell). In addition, the channel state of a particular cell/channel quality refers to the state/quality of the channel or communication link formed between the eNB and the UE or the node to provide a communication service to the particular cell. LTE/LTE-A system based on the, UE includes an antenna port (s) of the downlink channel state of the particular node from a node to be transmitted on CRS (Cell-specific Reference Signal) the resources allocated to a particular node CRS (s) and/or CSI-RS (Channel State Information Reference Signal) can be measured by using a CSI-RS (s) transmitting on the resource. Generally adjacent nodes send the CSI-RS resource on the CSI-RS resources that are orthogonal to each other. CSI-RS resources that also is carrying a CSI-RS symbol and a CSI-RS resource configured for identifying a sub-carrier orthogonal (resource configuration), sub-frame offset (offset) and the transmission period (transmission period) CSI-RS is allocated by The subframe of the specific configuration of the sub-frame (subframe configuration), CSI-RS sequence of at least one kind of means different from each other.

In the present invention, PDCCH (Physical Downlink Control CHannel)/PCFICH (Physical Control Format Indicator CHannel)/PHICH ((Physical Hybrid automatic retransmit request Indicator CHannel)/PDSCH (Physical Downlink Shared CHannel) are each DCI (Downlink Control Information)/CFI (Control Format Indicator)/Downlink ACK/NACK (ACKnowledgment/Negative ACK)/DL data to carry time-set means a set of elements or resources of the frequency resource also, PUCCH (Physical Uplink Control CHannel)/PUSCH (Physical Uplink Shared CHannel)/PRACH (Physical Random Access CHannel) are each UCI (Uplink Control Information)/UL data/random access signal to carry the time-frequency resources of the set or the mean of a set of resource elements will be. In this invention, in particular, PDCCH/PCFICH/PHICH/PDSCH/PUCCH/PUSCH/or PRACH assigned to belong to this time-frequency resources or Each resource element (Resource Element, RE) PDCCH/PCFICH/PHICH/PDSCH/PUCCH/PUSCH/or called PRACH RE PDCCH/PCFICH/PHICH/PDSCH/PUCCH/PUSCH/PRACH resource. In the following the user equipment is represented that transmits the PUCCH/PUSCH/PRACH, respectively, PUSCH/PUCCH/or through PRACH on the uplink control information/UL data/are used as the same meaning as that transmitted random access signal. In addition, the expression that the eNB transmits the PDCCH/PCFICH/PHICH/PDSCH, respectively, PDCCH/PCFICH/PHICH/PDSCH through or over is used as the same meaning as that transmits a downlink data/control information.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows configuration of special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
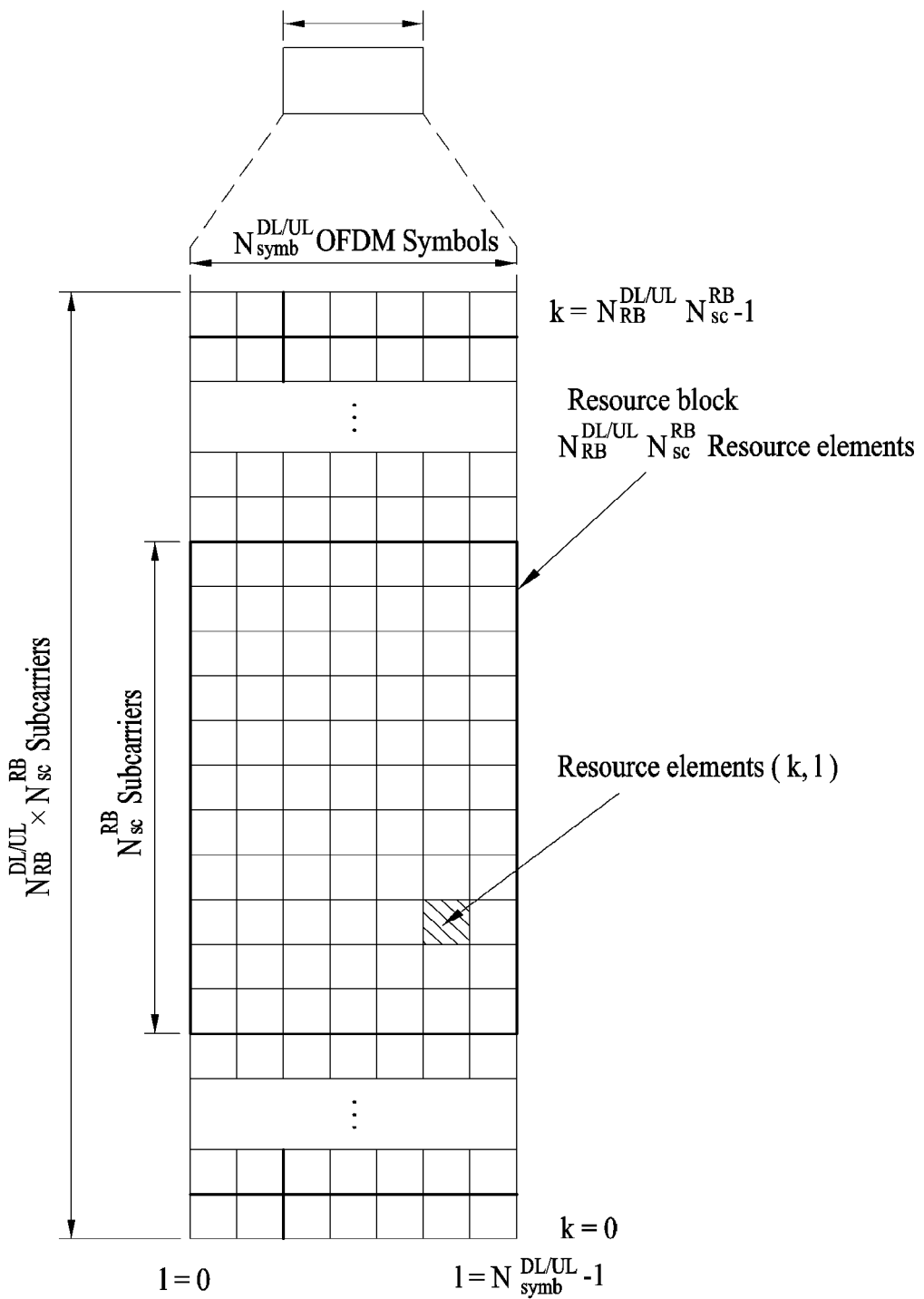
FIG. 2 is a diagram illustrating an example of a structure of a downlink/uplink (DL/UL) slot in the wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N_{RB}^{DL/UL}*N_{sc}^{RB}$ subcarriers and $N_{symb}^{DL/UL}$ OFDM symbols. $N_{RB}^{DL/UL}$ denotes the number of RBs in a DL slot and $N_{RB}^{UL}$ denotes the number of RBs in a UL slot. $N_{RB}^{DL}$ and $N_{RB}^{UL}$ depend on a DL transmission bandwidth and a UL transmission bandwidth, respectively. $N_{symb}^{DL}$ denotes the number of OFDM symbols in a DL slot, $N_{symb}^{UL}$ denotes the number of OFDM symbols in a UL slot, and $N_{sc}^{RB}$ denotes the number of subcarriers.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N_{RB}^{DL/UL}*N_{sc}^{RB}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency f0 in a process of generating an OFDM signal or in a frequency up-conversion process. The carrier frequency is also called a center frequency.

One RB is defined as $N_{RB}^{DL/UL}$ (e.g., 7) consecutive OFDM symbols in the time domain and as $N_{sc}^{RB}$ ((e.g., 12) consecutive subcarriers in the frequency domain. For reference, a resource composed of one OFDM symbol and one subcarrier is referred to a resource element (RE) or tone. Accordingly, one RB includes $N_{symb}^{DL/UL}*N_{sc}^{RB}$ REs. Each RE within a resource grid may be uniquely defined by an index pair (k, l) within one slot. k is an index ranging from 0 to $N_{RB}^{DL/UL}*N_{sc}^{EB}-1$ in the frequency domain, and l is an index ranging from 0 to $N_{symb}^{DL/UL}-1$ in the time domain.

In one subframe, two RBs each located in two slots of the subframe while occupying the same $N_{sc}^{RB}$ consecutive subcarriers are referred to as a physical resource block (PRB) pair. Two RBs configuring a PRB pair have the same PRB number (or the same PRB index). A VRB is a type of logical resource allocation unit introduced for resource allocation. The VRB is equal in size to the PRB. The VRB is classified into a localized VRB (LVRB) and a distributed VRB (DVRB) according to a VRB-to-PRB mapping scheme. Regardless of VRB type, a pair of RBs is allocated over two slots of a subframe by a single VRB number nVRB. LVRBs are directly mapped to PRBs so that VRB numbers (or VRB indexes) correspond equally to PRB numbers. That is, nPRB=nVRB. The LVRBs are numbered from 0 to NDL VRB-1 and NDL VRB=NDL RB. Hence, according to a localized mapping scheme, VRBs having the same VRB number are mapped to PRBs of the same PRB number in the first and second slots. In contrast, DVRBs are mapped to PRBs after being interleaved. Accordingly, DVRBs having the same VRB number may be mapped to PRBs of different PRB numbers in the first and second slots. Two PRBs, which are respectively located at two slots of the subframe and have the same VRB number, will be referred to as VRB pair.

Figure 3:
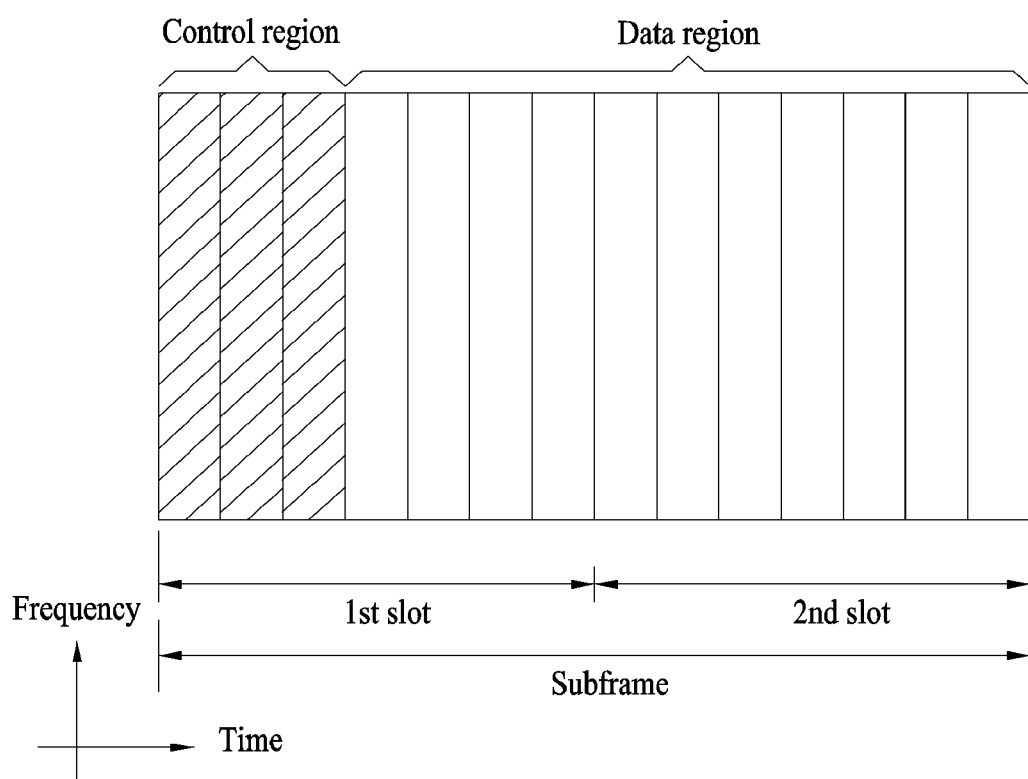
FIG. 3 is a diagram illustrating an example of a structure of a DL subframe used in a 3rd generation partnership project (3GPP) long term evolution-advanced (LTE-A) system.

FIG. 3 illustrates the structure of a DL subframe used in a 3GPP LTE/LTE-A system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual UEs within a UE group, Tx power control information, and activity information of voice over Internet protocol (VoIP). The size and usage of the DCI carried by one PDCCH are varied depending on DCI formats. The size of the DCI may be varied depending on a coding rate. In the current 3GPP LTE system, various formats are defined, wherein format 0 is defined for an uplink, and formats 1, 1A, 1B, 1C, 1D, 2, 2A, 3, and 3A are defined for a downlink. Combination selected from control information such as a hopping flag, RB allocation, modulation coding scheme (MCS), redundancy version (RV), new data indicator (NDI), transmit power control (TPC), cyclic shift, cyclic shift demodulation reference signal (DMRS), UL index, channel quality information (CQI) request, DL assignment index, HARQ process number, transmitted precoding matrix indicator (TPMI), precoding matrix indicator (PMI) information is transmitted to the UE as the downlink control information.

Generally, a DCI format capable of being transmitted to the UE differs according to transmission mode (TM) configured for the UE. In other words, for the UE configured as a specific TM, all DCI formats cannot be used and only predetermined DCI format(s) corresponding to the specific TM can be used.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. In a 3GPP LTE system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. In the 3GPP LTE/LTE-A system, SSs for respective PDCCH formats may have different sizes and a dedicated SS and a common SS are defined. The dedicated SS is a UE-specific SS and is configured for each individual UE. The common SS is configured for a plurality of UEs. Table 3 shows aggregation levels for defining SSs.

TABLE 3

| Search Space | | | Number of PDCCH |
|---|---|---|---|
| Type | Aggregation Level L | Size [in CCEs] | candidates $M^{(L)}$ |
| UE- | 1 | 6 | 6 |
| specific | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to 1, 2, 4, or 8 CCEs according to CCE aggregation levels. An eNB transmits an actual PDCCH (DCI) on a PDCCH candidate in an SS and a UE monitors the SS to detect the PDCCH (DCI). Here, monitoring refers to attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

An eNB may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of DCI transmitted on one PDCCH may vary according to DCI format and the size of the DCI may vary according to coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a radio network temporary identity (RNTI) 'A' and information about data transmitted using a radio resource 'B' (e.g., frequency location) and using transport format information 'C' (e.g., transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

For demodulation of a signal transmitted between an eNB and a UE, a reference signal (RS) to be compared with a data signal is needed. The RS indicates a signal of a predefined special waveform, known to the eNB and UE, transmitted from the eNB to the UE or from the UE to the eNB and is referred to as a pilot signal. RSs are classified into a cell-specific RS (CRS) commonly used by all UEs in a cell and a demodulation RS (DM RS) dedicated to a specific UE. A DM RS that the eNB transmits for DL data demodulation for a specific UE may be referred to specifically as a UE-specific RS. The DL DM RS and CRS may be transmitted together or one of the DM RS or the CRS may be transmitted. Nonetheless, in the case in which only the DM RS is transmitted without the CRS, an RS for channel measurement should be separately provided because the DM RS transmitted by applying the same precoder as data can be used only for demodulation. For example, in 3FPP LTE(-A), a CSI-RS, which is an additional RS for measurement, is transmitted to the UE so that the UE may measure CSI. The CSI-RS is transmitted in every prescribed transmission period comprised of multiple subframes, unlike a CRS transmitted in every subframe, based on the fact that channel state does not undergo a substantial variation over time.

Figure 4:
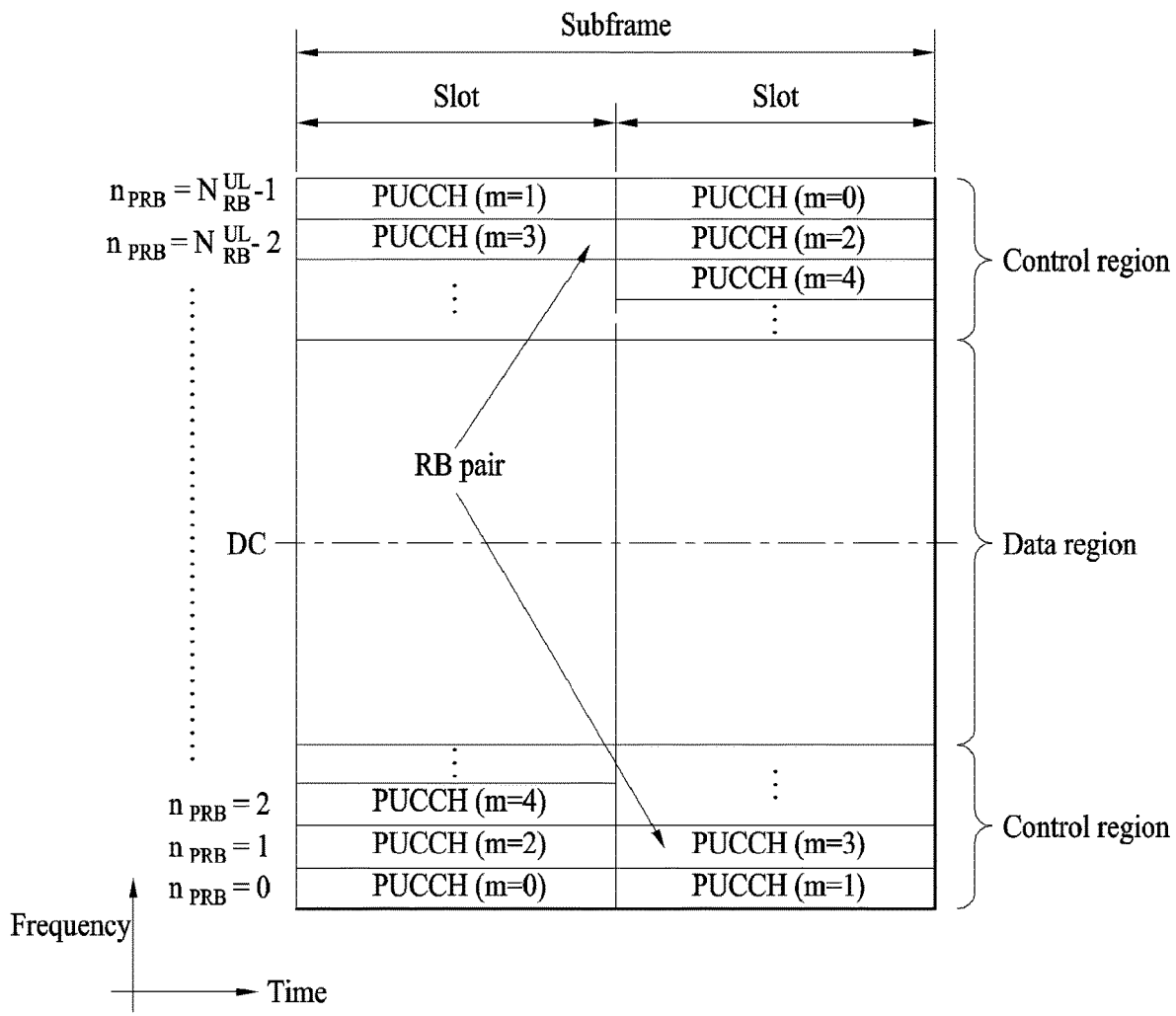
FIG. 4 is a diagram illustrating an example of a structure of a UL subframe used in the 3GPP LTE-A system.

FIG. 4 illustrates the structure of a UL subframe used in a 3GPP LTE/LTE-A system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to deliver user data.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency f0 in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarrier.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g., a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

The quantity of the uplink control information (UCI) that may be transmitted from the user equipment for the subframe depends on the number of SC-FDMA symbols available for control information transmission. The SC-FDMA symbols available for UCI mean the remaining SC-FDMA symbols except for SC-FDMA symbols for reference signal transmission for the subframe, and the last SC-FDMA symbols of the subframe is excluded in case of the subframe for which a sounding reference signal (SRS) is set. The reference signal is used for coherent detection of the PUCCH. The PUCCH supports variable formats in accordance with information which is transmitted. Table 4 illustrates a PUCCH format and a mapping relation of UCI in the LTE/LTE-A

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH format 1 series are mainly used to transmit ACK/NACK information, PUCCH format 2 series are mainly used to carry channel state information (CSI) such as channel quality indicator (CQI)/precoding matrix indicator (PMI)/rank indicator (RI), and PUCCH format 3 series are mainly used to transmit ACK/NACK information.

The present invention relates to a resource allocation scheme of a UE or a relay UE, and relates to efficient resource management between a wireless access network (WAN) link and a D2D link.

Figure 5:
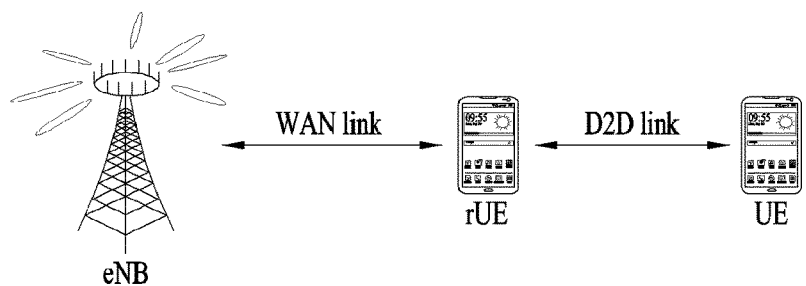
FIG. 5 is a diagram illustrating an example of a device-to-device (D2D) communication method according to an embodiment of the present invention.

The relay UE (rUE) refers to a UE that operates as a relay to provide network connectivity to a UE located outside of a coverage area of a serving eNB. FIG. 5 illustrates a link between the eNB and the rUE and a link between the rUE and the UE according to an embodiment of the present invention. Referring to FIG. 5, the UE may be a UE located outside of a coverage area of the eNB. The rUE may deliver information received from the eNB to the UE or deliver information received from the UE to the eNB while maintaining both the link between the eNB and the rUE and the link between the rUE and the UE. Some of signals transmitted and received by the rUE through the link between the eNB and the rUE may be information irrelevant to the UE, and such information will not be relayed to the UE. Similarly, some of signals transmitted and received by the rUE through the link between the rUE and the UE may be information irrelevant to the eNB, and the information will not be relayed to the eNB. In this instance, the link between the eNB and the rUE is referred to as the WAN link, and the link between the rUE and the UE is referred to as the D2D link. Meanwhile, even though a description is given using the rUE as an example, the present invention can be similarly applied to a WAN link between the eNB and the UE and a D2D link between the UE and another UE.

Resource Partitioning

Figure 6:
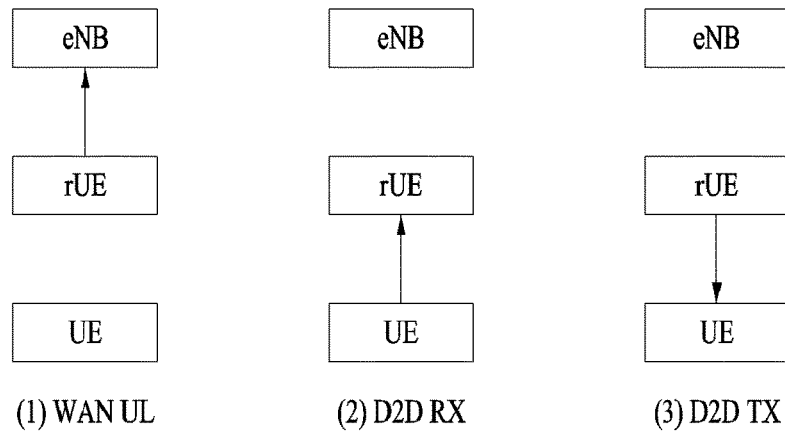
FIG. 6 is a diagram illustrating an example of a transmission or reception operation performable by a terminal that supports D2D communication.

The rUE operates in one of three transmission modes illustrated in FIG. 6 at one time instance.

WAN UL: WAN UL refers to transmission of a control channel (feedback) and/or data from the rUE to the eNB. In this instance, the control channel is feedback on WAN DL. In addition, the control channel and the data may include an object for delivery of feedback or data received from the UE through the D2D link.

D2D TX: D2D TX refers to transmission of a control channel (feedback) and/or data from the rUE to the UE.

D2D RX: D2D RX refers to transmission of a control channel (feedback) and/or data from the UE to the rUE. The rUE receives the control channel (feedback) and/or data from the UE.

Therefore, before a relay operation is started, the eNB, the rUE, and the UE need to commonly recognize which transmission is performed in which resource region. To this end, a scheme of allocating resources by the eNB and a scheme of allocating resources by the rUE may be used.

Scheme of Allocating Resources by the eNB

The eNB may configure a resource for D2D Tx/Rx for the rUE. This scheme may be divided into a semi-static scheme and a dynamic scheme. When the semi-static scheme is used, a particular SF and RB are configured for D2D Tx/Rx during a predetermined interval, and the configuration may be repeated for a predetermined period. This may be achieved by allocating a semi-persistent resource region through a WAN DL control channel as in semi-persistent scheduling (SPS), or by reporting a resource region through an upper layer signal as radio resource control (RRC). In this instance, when a Tx/Rx pattern is predetermined, an index of the pattern may be reported. On the other hand, the dynamic scheme is a scheme in which a resource region to be used for D2D Tx or Rx is dynamically allocated through a control channel of WAN DL. A major feature of the scheme of allocating resources by the eNB is that the eNB separately configures a resource for D2D Tx and a resource for D2D Rx for the rUE. The rUE is allowed to perform D2D Tx of the resource for D2D Tx, and is not allowed to perform D2D Tx of the resource for D2D Rx. In other words, a resource designated as the resource for D2D Rx for the rUE may be regarded as a resource dedicated for D2D Tx of a UE outside of a coverage area.

Scheme of Allocating Resources by the rUE

Resource allocation schemes employed by the rUE may be broadly divided into two schemes. In a first scheme, the rUE arbitrarily divides resources to configure a resource to be used for D2D Tx and a resource to be used for D2D Rx in a D2D resource region configured by the eNB. In this instance, the D2D resource region may be semi-statically or dynamically configured as in the scheme of allocating resources by the eNB. The rUE allocates all or a part of the given D2D resource region by dividing the region into a resource for D2D Tx and a resource for D2D Rx.

Figure 7:
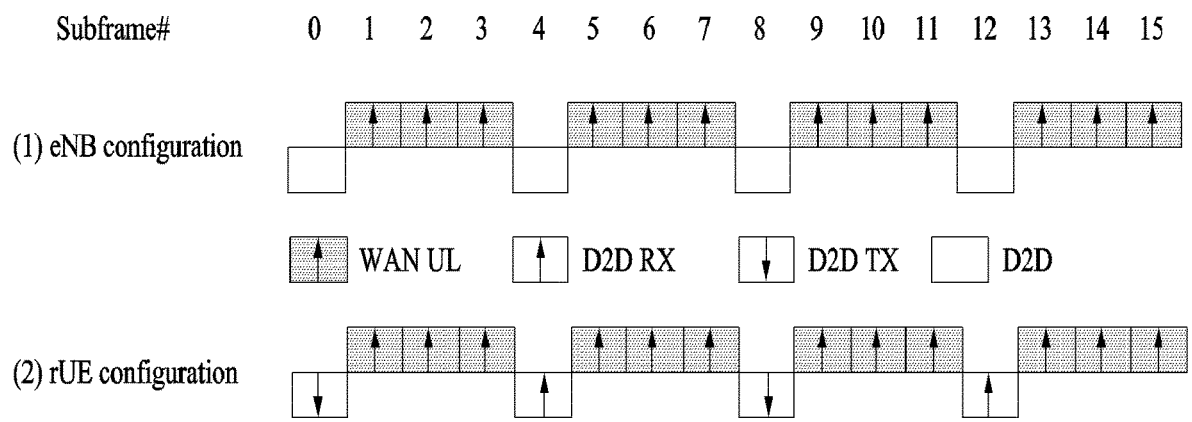
FIGS. 7 and 8 are diagrams illustrating examples of resource configuration for D2D communication.

FIG. 7 illustrates that when one SF is periodically allocated to a D2D link every four SFs, the rUE configures a corresponding D2D resource to be alternately used for D2D Tx and D2D Rx.

Figure 8:
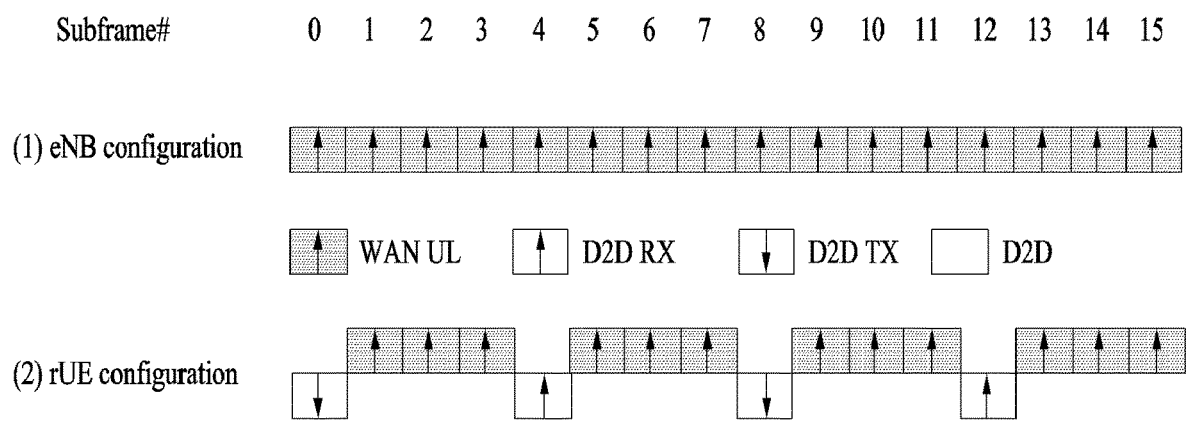

Another scheme may be used such that the rUE divides the entire available resource region (this region may be configured by the eNB) according to respective transmission modes to configure resources for WAN UL, D2D Tx and D2D Rx. FIG. 8 illustrates that a D2D SF and a D2D Tx/Rx SF are configured by the rUE rather than the eNB.

When the eNB configures a D2D or D2D Tx/Rx resource region, this scheme may be used as feedback from the rUE with respect to the configuration. In other words, the rUE may acquire interference information, channel information, and a traffic load between the rUE and the UE, etc. in a discovery procedure, etc., perform optimized resource allocation for the rUE based on the information, and then report the resource allocation to the eNB. Resource allocation by the rUE may be divided into the three respective modes, and may be divided into WAN link and D2D link. The eNB may approximately configure the D2D or D2D Tx/Rx resource region based on the reported information.

In particular, when a set of predetermined SF patterns is configured by combinations of respective transmission modes, and one of the patterns of the set is configured as a resource region, the rUE selects one or a plurality of most optimum patterns from a viewpoint of the rUE and reports the patterns to the eNB, and the eNB may allocate a D2D resource to the rUE with reference to the patterns. The eNB may simply confirm a resource region configured by the rUE. In this instance, it can be understood that resource division and allocation are performed only by the rUE. When the traffic load, the channel information, and the interference information change over time, the rUE may select optimum resource allocation from a viewpoint of the rUE and feed the optimum resource allocation back, or request resource reallocation. The eNB may periodically or aperiodically request feedback.

rUE to eNB/UE Signaling

Scheme of Allocating Resources by the eNB

Even when resource division and allocation are performed by the eNB according to respective transmission modes, a UE (located outside a coverage area) may not acquire the information from the eNB, and thus signaling needs to be performed by the rUE. The rUE may receive an allocated resource before D2D communication with the UE, and corresponding information needs to be transmitted to the UE for the first time before D2D communication. Therefore, a separate resource region which is predetermined between the rUE and the UE may be previously agreed for transmission of resource allocation information. When resource reallocation is performed during D2D communication, resource reallocation information may be transmitted by being piggybacked on D2D data in a D2D Tx resource region or through a D2D control channel.

Scheme of Allocating Resources by the rUE

When resource division and allocation are performed by the rUE according to respective transmission modes, corresponding information needs to be reported to the eNB in addition to the UE. Signaling by the UE may be similar to a case in which resource allocation is performed by the eNB. Signaling by the eNB may only include information about D2D communication, and may additionally include information about D2D Tx/Rx. This signaling may be performed through an upper layer signal such as RRC, through a control channel such as a PUCCH, or by being piggybacked on a PUSCH.

Upon acquiring resource division and allocation information of the rUE, the eNB may distinguish an SF for D2D link. Therefore, the eNB may identify an SF in which an existing WAN UL operation is blocked, and thus may analyze an operation in the SF in which the WAN UL operation is blocked according to a predetermined rule. For example, when SF #n is configured as a D2D Tx SF, if ACK/NACK transmission is scheduled in the SF, the rUE may agree that ACK/NACK transmission is performed by being combined with a valid WAN UL SF which appears for the first time thereafter. In this case, upon receiving the resource division and allocation information from the rUE, the eNB recognizes that SF #n is configured as the D2D Tx SF, and does not attempt to receive ACK/NACK. The eNB expects ACK/NACK combined with a subsequent valid WAN UL SF to be received, and performs decoding according such expectation.

Figure 9:
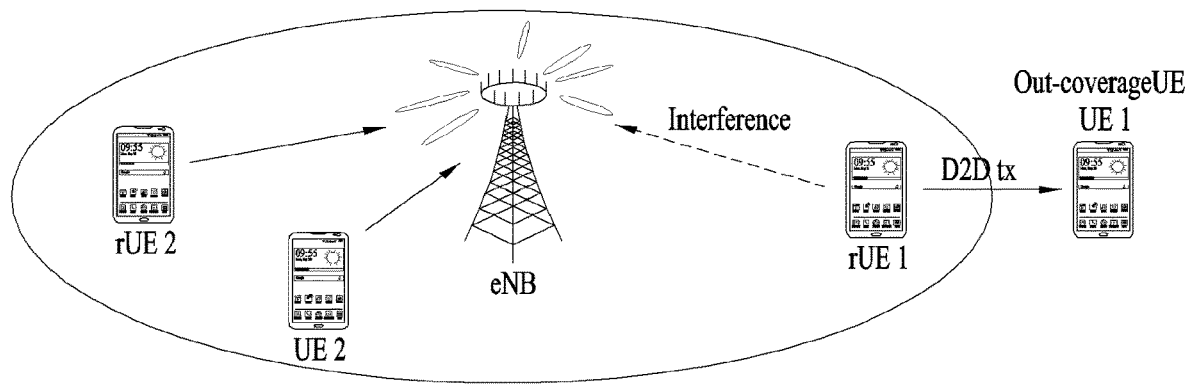
FIG. 9 is a diagram illustrating an example of interference by D2D communication according to an embodiment of the present invention which affects communication between a base station and a terminal.
Figure 9:
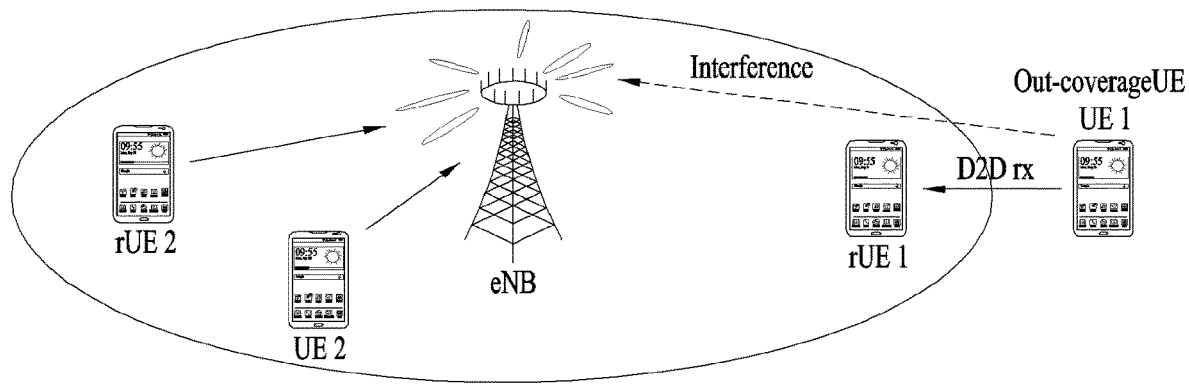

In particular, D2D Tx/Rx division information may be useful for the eNB. For example, in a D2D Tx SF, strong interference occurs due to D2D Tx of the rUE which is connected to the eNB and thus relatively close to the eNB, and thus a corresponding resource may not be used for WAN UL. On the other hand, in a D2D Rx SF, D2D Rx of the rUE occurs by a UE which is out of a coverage area of the eNB and relatively far apart from the eNB, and thus interference in the eNB is relatively weak, and WAN UL of another rUE or another UE may be scheduled in a corresponding resource region. FIG. 9 illustrates that a D2D Rx resource region may be reused for WAN UL transmission of rUE2 or UE2. For this reason, as described in the foregoing, it is advantageous to separate a D2D Tx resource from a D2D Rx resource from a viewpoint of the rUE.

When Multi-Cluster Transmission is Used

Meanwhile, resource division and allocation by the rUE may be more useful when the rUE may perform multi-cluster transmission. Multi-cluster transmission refers to transmission of a maximum of two non-adjacent RB clusters for one CC. Therefore, for an SF which is subjected to multi-cluster scheduling, the rUE may use one of multiple clusters for WAN UL transmission, or use one cluster for WAN UL and the other cluster for D2D Tx.

In this case, resource division and allocation information signaling to the eNB and the UE by the rUE may vary depending on whether the rUE performs WAN UL in the SF subjected to multi-cluster scheduling or whether the rUE performs both WAN UL and D2D Tx. When the rUE performs both WAN UL and D2D Tx, the SF may be distinguished by WAN UL in resource allocation information delivered to the eNB, and may be distinguished by D2D Tx in resource allocation information delivered to the UE. In other words, the eNB recognizes the SF as an SF in which WAN UL is not blocked, and the UE recognizes the SF as an SF in which D2D UL is not blocked. On the other hand, when the rUE uses the SF only for WAN UL, the SF may be distinguished by WAN UL in resource division and allocation information delivered to the UE.

Figure 10:
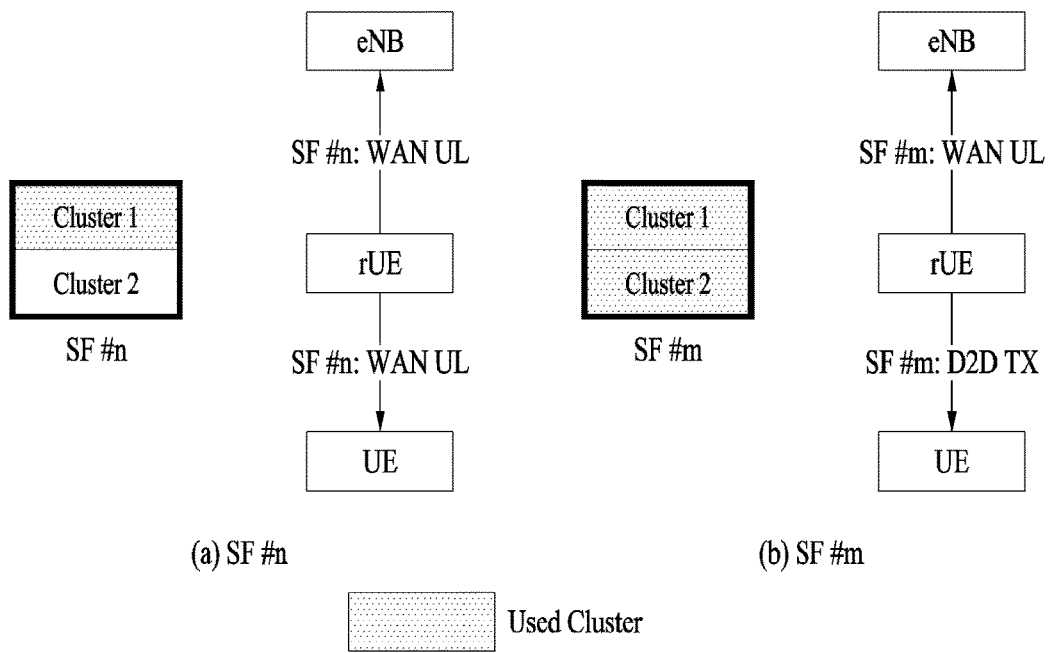
FIG. 10 is a diagram illustrating an example of signaling of a terminal when multi-cluster transmission according to an embodiment of the present invention is configured.

FIG. 10 illustrates signaling of the rUE in a multi-cluster-configured SF according to an embodiment of the present invention. Referring to FIG. 10, it is presumed that, when two clusters (clusters 1 and 2) are scheduled, one of the clusters (cluster 2) is used for D2D Tx. In this instance, only cluster 1 is used in SF #n corresponding to FIG. 10(a), and thus the rUE may signal SF #n distinguished by WAN UL to both the eNB and the UE. Referring to FIG. 10(b), both clusters 1 and 2 are used in SF #m, and thus the rUE needs to signal SF #m distinguished by use for WAN UL to the eNB, and signal SF #m distinguished by use for D2D Tx to the UE.

Meanwhile, this may cause wasteful use of cluster 2. Thus, a separate transmission mode (WAN-D2D Tx) may be newly defined for a case in which multi-cluster transmission may be performed. Therefore, multi-cluster transmission may not be configured in an SF distinguished by WAN UL or D2D Tx/Rx, and both cluster 1 and cluster 2 may be used for transmission by the rUE in an SF distinguished by WAN-D2D Tx.

Signaling may be simply formed as a bitmap. For example, in signaling to the eNB, it is possible to transmit a bitmap having a value 1 for an SF in which WAN UL is blocked (that is, D2D Tx/Rx SF) and having a value 0 for other SFs. In addition, in signaling to the UE, it is possible to transmit a bitmap having a value 1 for an SF in which D2D Tx/Rx is blocked (that is, WAN UL SF) and having a value 0 for other SFs. In particular, in signaling to the UE, configuration for D2D Tx/Rx needs to be transmitted, and thus it is possible to additionally transmit a bitmap having a value 1 for D2D Tx and having a value 0 for D2D Rx. Meanwhile, D2D Tx/Rx information may be additionally transmitted to the eNB.

Referring to the bitmap, a position at which a first bit is transmitted may be set to a first SF of a radio frame to allow the eNB and the rUE/UE to commonly recognize application timing thereof. The rUE/UE receiving the bitmap may understand that a corresponding pattern is repeated during a predetermined continuous time interval or until reconfiguration.

Meanwhile, the rUE may report, to the eNB, auxiliary information for D2D resource division and allocation as below for efficient resource division and allocation of the eNB. The report may be performed in response to a request from the eNB or without a request.

Resource utilization information: Resource utilization information is information about a ratio of resources actually used by the rUE for D2D communication with the UE to D2D resources allocated by the eNB. A utilization rate may be defined, and a corresponding value may be reported by the rUE. For example, the utilization rate may be defined as [amount of resources actually used for D2D Tx/Rx]/[total amount of resources for D2D communication allocated from the eNB]. In addition, when a resource location (or the number of RBs) is fixed for each SF, the utilization rate may be defined as [the number of SFs actually used for D2D Tx/Rx]/[the total number of D2D SFs allocated from the eNB].

Location of an avoided (or preferred) resource: The location refers to location information, etc. of an SF in which D2D communication may not be performed due to interference from an adjacent cell in a resource region allocated by the eNB. On the other hand, when an SF is in a relatively excellent channel state, location information of the SF may be reported as preferred resource information.

Information about a location of an avoided resource may have a form of a subset of a bitmap that indicates resource division and allocation received from the eNB. For example, a location corresponding to 1 of a bitmap for the information about the location of the avoided resource corresponds to 1 (that is, D2D SF) of the bitmap that indicates resource division and allocation received from the eNB and simultaneously indicates an SF available to the rUE to communicate with the UE. A location corresponding to 0 of the bitmap for the information about the location of the avoided resource may indicate other SFs.

When the information about the location of the avoided resource is delivered to the eNB, the utilization rate may be defined as below.

When a remainder obtained by subtracting a portion corresponding to the avoided resource from resources allocated to the rUE for D2D communication from the eNB is set to the amount of available resources.

Utilization rate=[the amount of resources actually used for D2D communication in the amount of resources available for D2D communication]/ [the amount of resources available for D2D communication]

D2D channel information, interference measurement information, etc. may be directly reported to the eNB.

This may have the same form as existing feedback of a received signal strength indicator (RSSI), reference signal received power (RSRP), and channel state information (CSI). In this instance, an indicator or feedback mode distinguished from those of WAN link may be needed.

The information may be delivered through an upper layer signal, or transmitted to the eNB through a control channel such as a PUCCH, or by being piggybacked on a PUSCH. In addition, the information may be delivered periodically or aperiodically in response to a request from the eNB. When resource utilization for D2D communication is changed to a certain extent or more and/or the location of the avoided resource is changed, the information may be unsolicitedly reported, and the eNB may instruct that only some of the information be selectively reported. The eNB receiving the information from the rUE may newly perform resource division and allocation based on the received information.

Figure 11:
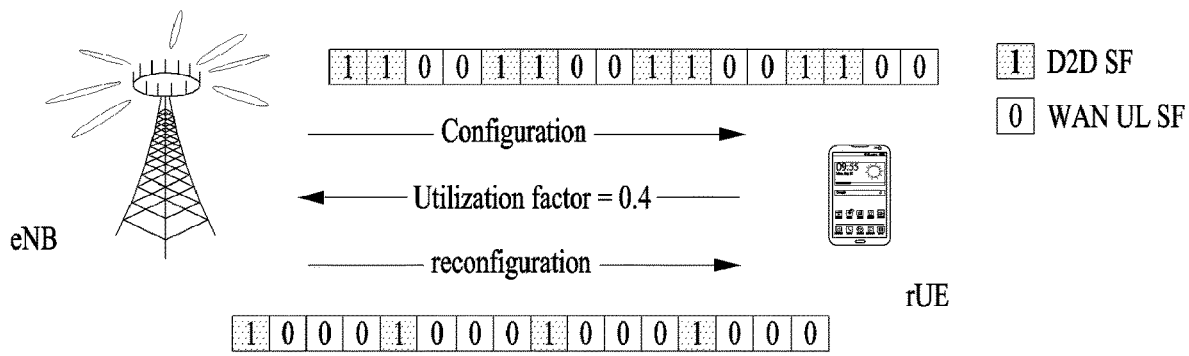
FIGS. 11 and 12 are diagrams illustrating examples of signaling between a base station and a terminal according to embodiments of the present invention.

Examples of resource division and allocation, transmission (reception) of information, and resource division and reallocation described above are given below. When resource division and allocation (for example, configuration 1), which are performed at intervals of 16 ms by the eNB as illustrated in FIG. 11, are performed using a bitmap, the rUE performs D2D Tx/Rx or WAN UL Tx according to configuration 1. In addition, the rUE may calculate and report a utilization rate of resources allocated based thereon. When the utilization rate is 0.4, the eNB may cut the amount of resources distinguished by D2D communication approximately in half and perform reallocation (for example, configuration 2).

As another scheme, the resource configuration scheme of the rUE described above is used as below. In this instance, even though the rUE does not explicitly or directly report resource utilization information to the eNB, the rUE may perform resource division and allocation suitable for load of the rUE in a similar circumstance and deliver the information to the eNB, or report an index of a suitable pattern such that resource reallocation is performed when a pattern is predetermined.

Figure 12:
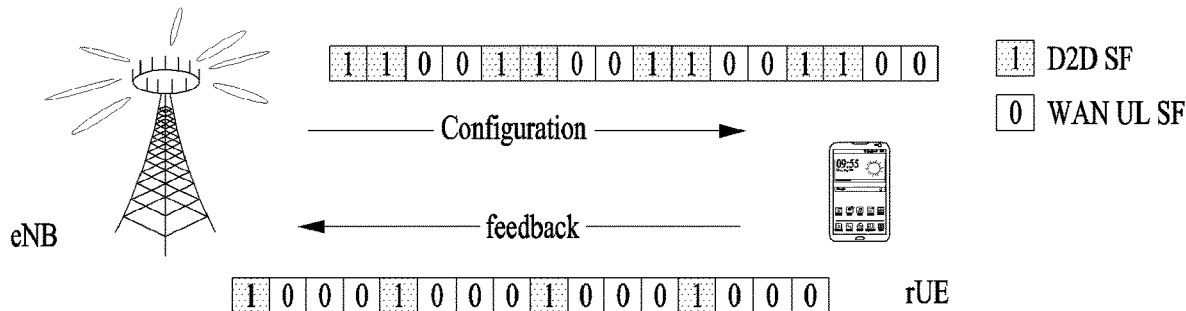
Figure 12:
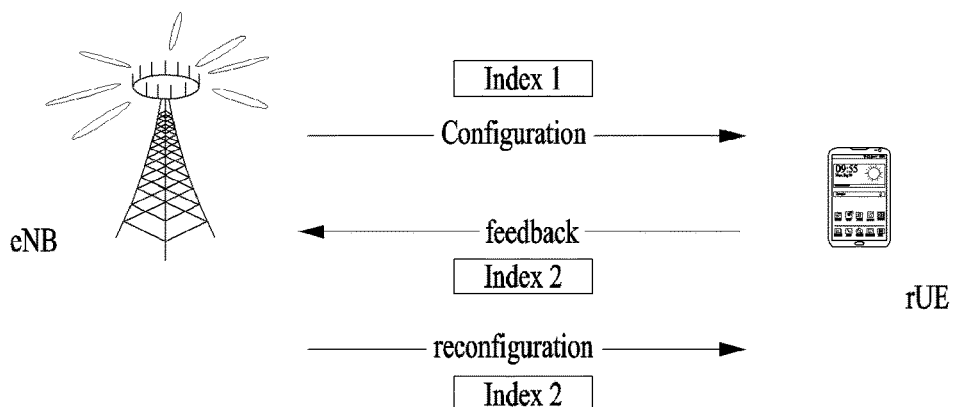

FIG. 12 illustrates a signaling procedure corresponding to a case in which the rUE requests that the amount of resources configured as D2D SFs by the eNB be decreased to half and used. In FIG. 12(a), the rUE may directly signal a preferred configuration (for example, configuration 2) to the eNB. Alternatively, as in FIG. 12(b), the rUE may report a predetermined configuration index (for example, configuration index 2) close to the preferred configuration (for example, configuration 2).

In FIG. 12(b), each configuration index indicates a bandwidth (RB) in addition to an SF configuration. For example, while configuration indices 1 and 2 are related to 2RB, configuration index 3 is related to 1RB. When the eNB attempts to reduce the amount of resources for D2D communication to half, configuration index 1 may be reconfigured as configuration index 2 or configuration index 3.

As in FIG. 12(a), the rUE may report an avoided resource or an available resource by feeding back resource division and allocation information in a bitmap. In this instance, the utilization information, etc. may be additionally reported, and the eNB may reallocate all or some of available resources to the rUE or adjust the amount and location of resource allocation of other UEs and the rUE based on D2D resource utilization information.

Figure 13:
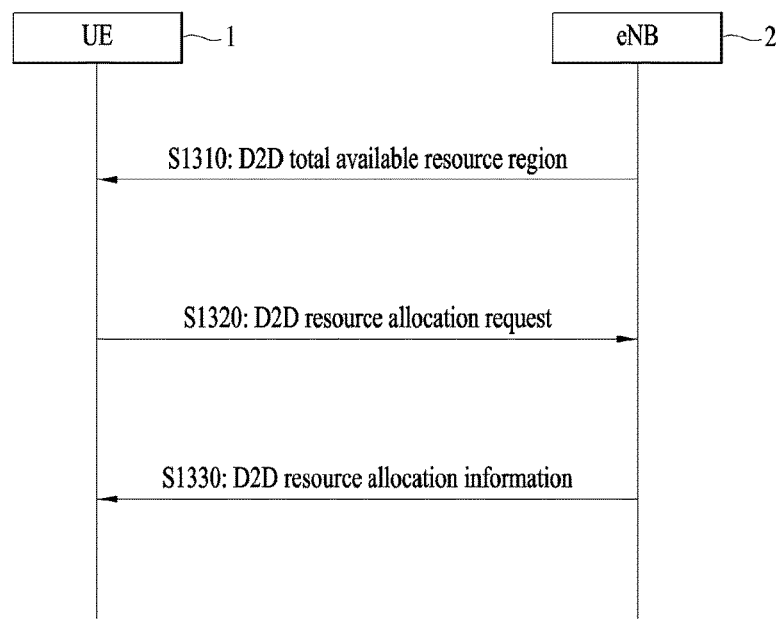
FIG. 13 is a flowchart illustrating an operation according to embodiment(s) of the present invention.

FIG. 13 illustrates an operation according to an embodiment of the present invention. A UE 1 is a terminal configured to perform D2D communication. In S1310, the UE 1 may receive information about the entire available resource region of D2D communication from an eNB 2. The entire available resource region of D2D communication refers to a region for D2D communication in the entire resource region that may be scheduled by the eNB 2. For example, the resource region may be identified using a subframe as a unit in the 3GPP LTE(-A) system.

In S1320, the UE 1 may transmit, to the eNB 2, a request for resource allocation to be used for D2D communication based on information about the entire available resource region and channel information of D2D communication. The request for resource allocation is a request for a resource region desired for D2D communication by the UE 1, and the eNB 2 may not allocate the resource region indicated by the request to D2D communication.

In S1330, the UE 1 may receive resource allocation information for D2D communication determined based on the request for resource allocation from the eNB 2.

At least one of the information about the entire available resource region of D2D communication, the request for resource allocation, and the resource allocation information may be a bitmap. For example, as described in the foregoing, each bit value may be configured to indicate a subframe.

The channel information of D2D communication may include at least one of a traffic load, a channel state, and an interference amount of a D2D communication channel between the UE 1 and a peer UE (not illustrated).

In addition, the request for resource allocation may include information about a D2D operation mode divided into D2D transmission or D2D reception. The eNB 2 may determine a resource region for scheduling other UEs other than the UE 1 and the peer UE of the UE 1 using information about the D2D operation mode, and may schedule the other UEs in the resource region.

In addition, the UE 1 may transmit auxiliary information for resource allocation of D2D communication to a serving base station. The auxiliary information may include at least one of a resource utilization rate for D2D communication, an avoided or preferred resource for D2D communication, and information about a channel state and interference of D2D communication.

The eNB 2 receiving the auxiliary information may determine updated resource allocation information of D2D communication based on the auxiliary information, and transmit the updated resource allocation information to the UE 1.

In addition, when channel information of D2D communication is changed to an extent exceeding a predetermined range, the UE 1 may transmit another request for resource allocation to the serving base station.

Resources used for D2D communication may be differently defined according to a location of the UE, in particular, a distance or a connection state between the eNB and the UE, or channel state between the eNB and the UE reflecting them. For example, referring to FIG. 9 above again, when a resource that may be used for D2D Tx by the rUE which has a good channel state with respect to the eNB due to a short distance to the eNB, and thus strongly interferes with signal reception of the eNB is a resource region A, a resource that may be used for Tx by the UE which is out of a coverage area, has a poor channel state with respect to the eNB due to a long distance to the eNB, and thus rarely interferes with signal reception of the eNB may be a resource region B. In other words, the UE may be allowed to determine which one of the resource regions A and B is used for D2D Tx according to the location of the UE or the channel state of the eNB-UE. For example, when the resource regions A and B are predetermined, the UE may use resource region A for D2D Tx if a DL signal received from the eNB is higher than a particular threshold value and the UE may use the resource region B for D2D Tx if the DL signal is lower than the particular threshold value.

Figure 15:
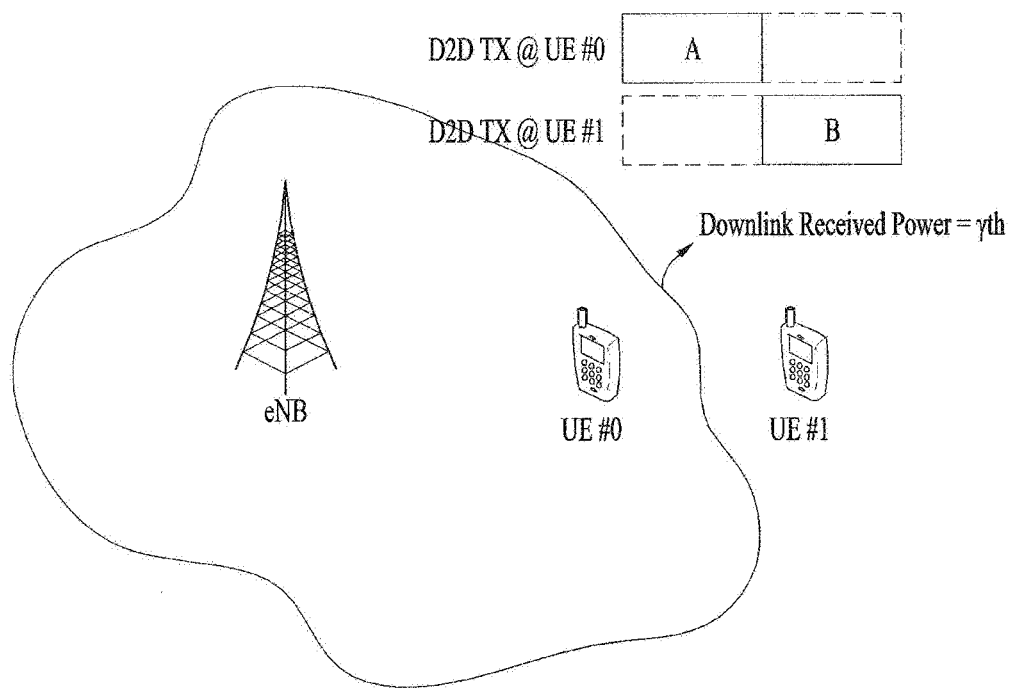
FIG. 15 is diagram illustrating examples of method for configuring resource for D2D communication according to embodiments of the present invention.

FIG. 15 illustrates that a defined D2D Tx (available) resource region may be different between UE #1 receiving a DL signal lower than a threshold value yth and UE #0 receiving a DL signal higher than the threshold value yth. In particular, only a UE corresponding to a case in which the eNB-UE channel state is less than or equal to a certain level is allowed to use the resource region B since the eNB expects that interference due to D2D Tx is low. In this case, the resource region B insignificantly interferes with the eNB, and thus the eNB may not delicately adjust a D2D Tx operation in the resource region B, and UEs attempting D2D Tx in the resource region B may select a resource or configure power without an additional separate instruction of the eNB.

In other words, resource regions separated from each other may be defined with respect to D2D transmission, and the UE may use different resource regions depending on whether the UE is in an eNB coverage area or out of the eNB coverage area. In particular, a resource region only available to the UE out of the eNB coverage area may be separately defined. As described in the foregoing, the separated resource region may be allocated by the eNB, predefined, or activated by the eNB from a predefined resource region. Information about the separated resource region may be transmitted in a form of scheduling by a particular RNTI on a PDCCH of the eNB such as an SIB or an SPS.

Whether the UE is in the eNB coverage area or out of the eNB coverage area may be determined based on a threshold value of a power level, RSRP, an RSSI, an SINR, etc. of a signal received from the eNB. For example, the UE may be determined to be out of the coverage area when PDCCH BLER exceeds a particular threshold value (for example, for RLF, out-sync. is determined when BLER is 10% or more), and a DL signal less than or equal to the threshold value is not received again within a particular time interval based on a quality of the DL signal received through continuous link monitoring.

An operation may be differently defined depending on whether the UE is in the eNB coverage area or out of the eNB coverage area. For example, when a signal received from the eNB is lower than a predetermined threshold value, the UE is determined to be out of the coverage area, and D2D communication may be performed in a separate resource region delivered by the rUE or an available resource region separately predefined to be more freely used on the outside of the coverage area. On the other hand, when the signal is higher than the predetermined threshold value, the UE is determined to be in the coverage area, and eNB resource allocation may be monitored to perform D2D Tx and D2D Rx in a resource region indicated by the eNB. Even when the UE is in the coverage area, D2D communication may be performed by selecting an arbitrary resource from a resource region which is separated defined to be used in the coverage area.

Meanwhile, even when the UE is out of the coverage area, an eNB signal may be partially received. In this instance, the UE may determine a state of the UE (in/out of the eNB coverage area) based on a reception quality of the eNB signal or receive information about a separate resource region from the eNB. When the UE can receive the information about the separate resource region from the eNB, the UE may not need to receive the resource information delivered from another UE. Therefore, the UE may not search for a broadcast channel transmitted by a rUE, etc. or configure a link to the rUE for this purpose.

Although embodiments according to the present invention have been briefly described with reference to FIGS. 13 and 15, the embodiments related to FIG. 13 and/or FIG. 15 may include at least some of the above-described embodiments as an alternative or additionally.

Figure 14:
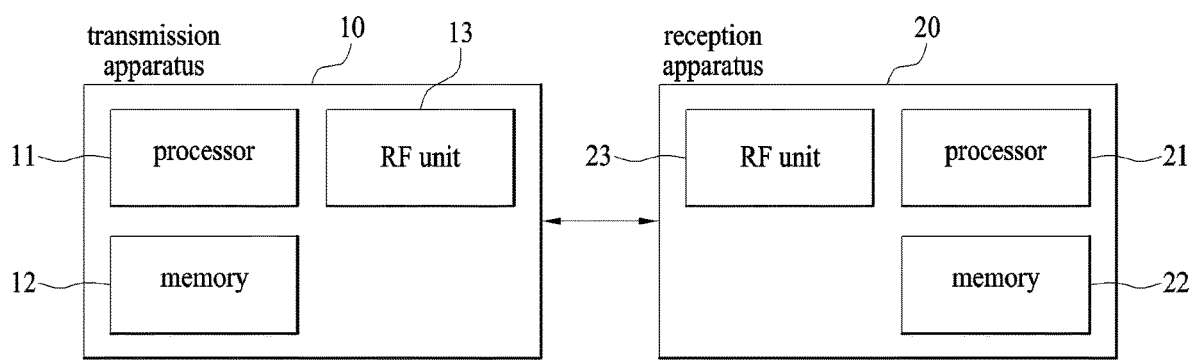
FIG. 14 is a block diagram illustrating devices for implementing embodiment(s) of the present invention.

FIG. 14 is a block diagram illustrating elements of a transmitting device 10 and a receiving device 20 for implementing the present invention. The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 1 land 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers. The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include Nr (where Nr is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit, and memory unit included in the eNB will be referred to as an eNB processor, an eNB RF unit, and an eNB memory, respectively.

The transmitting device 10 and/or the receiving device 20 may be configured as a combination of one or more embodiments of the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The embodiments of the present invention are applicable to a UE, a relay, base station, or other communication devices of the wireless communication system.

What is claimed is:
1. A method for resource allocation of a User Equipment (UE) configured to perform device-to-device (D2D) communication in a wireless communication system, the method comprising:
receiving, from a serving base station, a message including information on a transmission resource region, wherein the information on the transmission resource region includes information on available resources to transmit D2D data for when the UE is in an out-sync condition; and transmitting, to another UE, the D2D data based on a part of the available resources included in the information on the transmission resource region when the UE is in the out-sync condition.

2. The method according to claim 1, wherein the UE is determined to be in the out-sync condition when a radio link quality between the UE and the serving base station is equal to or greater than a threshold value within a time interval.

3. The method according to claim 2, wherein the threshold value corresponds to 10% Block Error Rate (BLER) of a downlink signal from the serving base station.

4. The method according to claim 2, wherein the radio link quality corresponds to Block Error Rate (BLER) based on a downlink signal from the serving base station.

5. The method according to claim 1, wherein the message is transmitted via a system information block (SIB).

6. The method according to claim 1, wherein the message further includes information on a reception resource region for the D2D communication.

7. A User Equipment (UE) configured to perform Device-to-Device (D2D) communication in a wireless communication system, the UE comprising:
a transceiver; and
a processor configured to:

control the transceiver to receive, from a serving base station, a message including information on a transmission resource region, wherein the information on the transmission resource region includes information on available resources to transmit D2D data for when the UE is in a condition, and control the transceiver to transmit the D2D data, to another UE, based on a part of the available resources included in the information on the transmission resource region when the UE is in an out-sync condition.

8. The UE according to claim 7, wherein the UE is determined to be in the out-sync condition when a radio link quality between the UE and the serving base station is equal to or greater than a threshold value within a time interval.

9. The UE according to claim 8, wherein the threshold value corresponds to 10% Block Error Rate (BLER) of a downlink signal from the serving base station.

10. The UE according to claim 8, wherein the radio link quality corresponds to Block Error Rate (BLER) based on a downlink signal from the serving base station.

11. The UE according to claim 7 wherein the message is transmitted via a system information block (SIB).

12. The UE according to claim 8, wherein the message further includes information on a reception resource region for the D2D communication.

* * * * *